No. 742,472. PATENTED OCT. 27, 1903.
P. P. MOSES.
COMBINED PLUMB, LEVEL, PROTRACTOR, COMPASS, AND SUN DIAL.
APPLICATION FILED MAY 10, 1902.
NO MODEL.
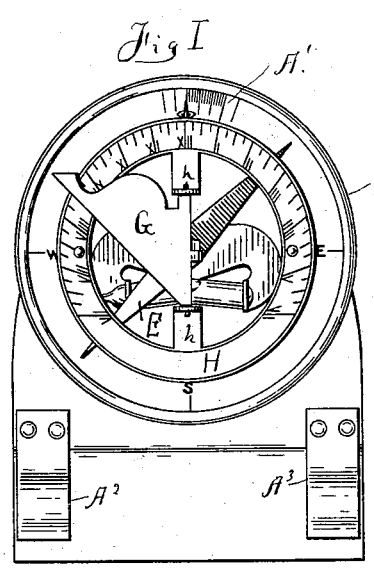
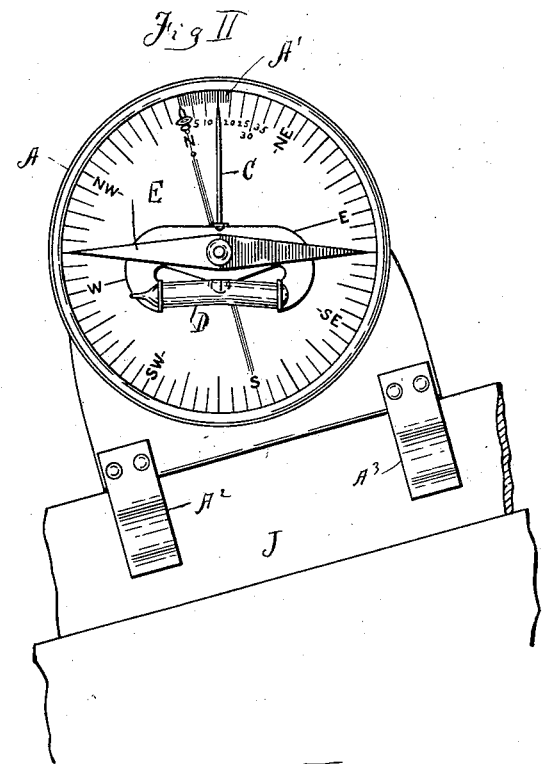
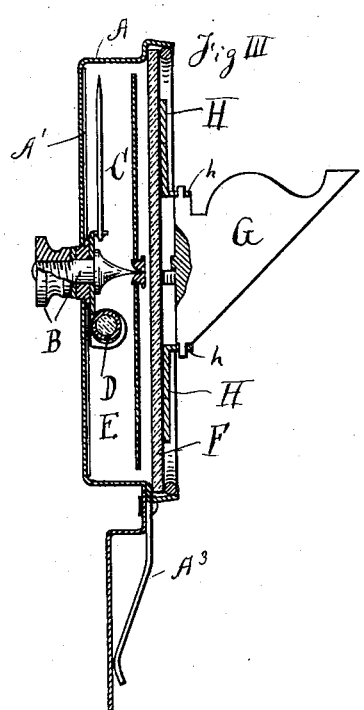
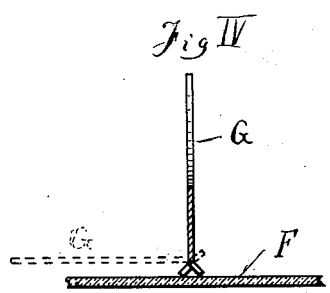
Witnesses:
A. L. Lord.
E. B. Donnelly.
Inventor.
Philo P. Moses.
W. E. Donnelly
his Att'y No. 742,472. Patented October 27, 1903.

UNITED STATES PATENT OFFICE.

PHILO P. MOSES, OF CLEVELAND, OHIO, ASSIGNOR OF ONE-HALF TO ALBIN J. MILLER, OF CLEVELAND, OHIO.

COMBINED PLUMB, LEVEL, PROTRACTOR, COMPASS, AND SUN-DIAL.

SPECIFICATION forming part of Letters Patent No. 742,472, dated October 27, 1903.

Application filed May 10, 1902. Serial No. 106,788. (No model.)

*To all whom it may concern:*

Be it known that I, PHILO P. MOSES, a citizen of the United States, residing at Cleveland, in the county of Cuyahoga and State of Ohio, have invented certain new and useful Improvements in a Combined Plumb, Level, Protractor, Compass, and Sun-Dial; and I do hereby declare the following to be a full, clear, and exact description of the invention, such as will enable others skilled in the art to which it pertains to make and use the same.

My invention relates to an instrument designed for the use of surveyors, mechanics, and hunters, the same being what I call a combined "level, protractor, compass, and sun-dial."

The objects of my invention are, first, to provide an accurate instrument which may be depended upon in its calculus pertaining to either the individual or collective functions of the device, as above enumerated, also an instrument which while perfect and conclusive in its calculus is economical in structural features to such an extent that the same can be placed upon the market at a price within the means of the ordinary mechanic or workman.

My invention consists in the combination in one and the same instrument of devices adapted to perform their functions individually and independently, while at the same time being arranged or assembled so that the collective action of any two of the parts or the auxiliary action of any two or more of the parts will result in obtaining a determination along one or more of the lines above enumerated.

With the above objects in view my invention also consists in assemblage of parts, in structural features, and in detail arrangement, all of which will be hereinafter fully set forth and explained.

In the drawings, Figure I is a view in elevation of an instrument constructed according to my invention. Fig. II illustrates my device with glass and sun-dial attachment removed when the same is employed as a level or inclimoneter for the purpose of determining the plumb or level of an article to which it may be applied. In this connection the device is secured with a straight-edge, as illustrated in this figure. Fig. III is a sectional view of Fig. I and illustrating the instrument in condition to be used as a sun-dial. Fig. IV is a detail sectional view illustrating the manner in which the gnomen is secured to the glass plate, so as to be either projected at right angles therefrom or rest parallel therewith.

A represents a casing, which is preferably formed of struck-up sheet metal. This casing A is provided at its lower inner face with a dial A', divided into suitable subdivisions to indicate degrees and portions of degrees and also divided into spaces to designate the different compass-points and their subdivisions. Centrally located at the rear of the casing A is an adjustable stud B, comprising a bolt and nut. This stud B forms the mounting for a pointer C, a level-glass D, and also a magnetic needle or compass-needle E. All these parts—viz., the pointer C, the level-glass D, and the magnetic or compass needle E—are inclosed within the casing A by providing the forward end of said casing with a glass cover F. To the glass cover F is secured a gnomen G, which is adapted to be raised to position, as shown in Fig. IV, for use as an indicator for a sun-dial or to be laid parallel with the face of the glass F, as illustrated by dotted lines in Fig. IV, when the instrument is not used as a sun-dial and for the purpose of packing the instrument. The mounting of the gnomen G is accomplished by securing pivotally the same to two lips $h$ $h$ of a dial H, which is in turn secured to the glass F. This dial H is subdivided into spaces to designate the hour and subdivisions of the same, arrangement being such that this dial is used in connection with the gnomen G when the instrument has been properly adjusted by means of the magnetic needle E and dial A'.

To the lower end of the casing A is secured two clamps $A^2$ $A^3$, whereby the instrument may be attached to a straight-edge J, as set forth in Fig. II of the drawings, when it is desired to use the device as a plumb or level or for the purpose of determining an inclination or angle.

The operation of the device is as follows: The pointer C being adjustable and the level-glass D being secured so as to connect with said pointer, (see Figs. II and III,) it being desired to determine as to whether an object is level, a straight-edge J may be secured by means of the clamps A² A³ to the casing A. The pointer C is set at zero, (the device being so adjusted that when the pointer is at zero the level-glass D will indicate a perfect horizon,) and thus the device can be used as an ordinary level. In order to determine a vertical or plumb face, the pointer C is adjusted to ninety degrees, right or left, which brings the level-glass D to an exact right angle of its former position when determining a horizontal line. To determine the number of degrees that either lines or faces are out of level or plumb, the pointer C is moved until the level-glass D indicates that it has attained a horizontal position by counting the number of degrees deviating the angle of inclination is determined. In order to determine or estimate the height of a distant object, the device is set a predetermined distance from the object and level with the pointer at zero, this forming the base of a triangle. The pointer is then turned until it points directly toward the top of the object to be measured. This gives the inclination of the hypotenuse of the triangle in degrees, from which by the usual method the height of the object may be determined, and by using the compass, including the needle E and the dial A', the direction of the object may be determined in relation to the parts of said compass. When it is desired to use the device as an hour-glass to approximate the time of day, the device is adjusted as an ordinary sun-dial, and by means of the compass-needle E and dial A', according to the locality, the gnomen G is then raised, and the time will be indicated.

From the above it will be seen that this device embodies in one instrument a combination of elements which act in conjunction, two or more at a time, according to the result to be attained, and that the same is compact and convenient and also absolutely accurate in its determination.

What I claim is—

1. A combined level, protractor, and sun-dial comprising a dial for indicating degrees of inclination and the points of the compass; a pointer secured to and moving with a level-glass and mounted upon a stud centrally located in relation to said dial; a magnetic needle also mounted upon said stud and adapted to act in relation to the aforementioned dial; and a secondary dial to indicate the hours of the day with a gnomen adapted to act in conjunction with the latter dial, all combined in one and the same instrument.

2. The combination with the casing, having its lower portion formed with a straight-edge; of a pair of clamps attached to said straight-edge, a level-glass mounted in said casing, the glass arranged in the front end of the said casing, a dial secured to the said front glass, a pair of lips formed integral with the said front dial, and a gnomen pivotally mounted in the said lips.

Signed at Cleveland, in the county of Cuyahoga and State of Ohio, this 10th day of January, 1902.

PHILO P. MOSES.

Witnesses:
E. B. DONNELLY,
W. E. DONNELLY.